March 31, 1970  J. A. HOWARD  3,503,274
DRIVE TRANSMISSION GEARBOX
Filed May 9, 1968  2 Sheets-Sheet 1

INVENTOR:-
JOHN ARTHUR HOWARD
BY:- Mawhinney & Mawhinney
ATTORNEY

INVENTOR:-
JOHN ARTHUR HOWARD
BY:- Mawhinney & Mawhinney
ATTORNEY

United States Patent Office 3,503,274
Patented Mar. 31, 1970

3,503,274
DRIVE TRANSMISSION GEARBOX
John Arthur Howard, West Horndon, England, assignor to Rotary Hoes Limited, West Horndon, Essex, England
Filed May 9, 1968, Ser. No. 727,893
Claims priority, application Great Britain, May 12, 1967, 22,063/67
Int. Cl. F16h *3/08, 1/14, 1/20*
U.S. Cl. 74—325        7 Claims

ABSTRACT OF THE DISCLOSURE

A drive transmission gearbox comprising a driving shaft arranged at right-angles across one end of an output shaft, drives the latter through a substitutable pair of meshed bevel gear wheels, the bevel gear wheel on the driving shaft being optionally transferable to mesh the other bevel gear wheel at opposite ends of a diameter of the latter so as to drive the output shaft in one direction or the other.

---

The invention relates to a drive transmission gearbox of the kind having an output shaft which is driven, through a bevel gear wheel pair, from a driving shaft at right-angles to it, and is, for example, to be incorporated in an agricultural implement, such as a cultivator or grass cutter, and to be driven from the power take-off shaft of a tractor from which the implement is mounted.

There is a modern tendency to design agricultural implements so that they can be adapted for different uses, whereby to reduce the stock of implements which has to be held by a farmer, and in such cases it is often the case that an output shaft of the implement has to be driven at different basic ratios for adapting the drive to suit alternative purposes. This is true even if the implement is provided with a normal change-speed gearing.

While the invention is not limited in its scope to such agricultural uses it has particular application to them for the object of enabling them easily to have their basic drive ratios changed for adapting them to different purposes.

According to the invention, the driving shaft extends across the adjacent end of the output shaft and is adapted for its bevel gear wheel to be assembled to it in mesh with the bevel gear wheel of the output shaft in either of two diametrically-opposed positions so as to determine the direction of rotation of the output shaft relatively to the direction of rotation of the driving shaft.

According to a further feature, and in the case where the bevel gear wheels are of different effective diameters, both bevel gear wheels are assembled to their respective shafts so that they can easily be removed therefrom, and have the same axial dimension between their back faces and their cone points, whereby the bevel gear wheels on the respective shafts can be interchanged so as to reverse the ratio of the drive.

According to another feature, the driving shaft is driven from an input shaft which is parallel to it, and connected to drive it through a gear pair.

In such a case, and according to a still further feature, the gear wheels of the pair for transmitting drive from the input shaft to the driving shaft are assembled to their respective shafts so that they can easily be removed therefrom, whereby the said gear wheels can be substituted by another pair of gear wheels providing a different drive transmission ratio to the driving shaft.

Figure 1:
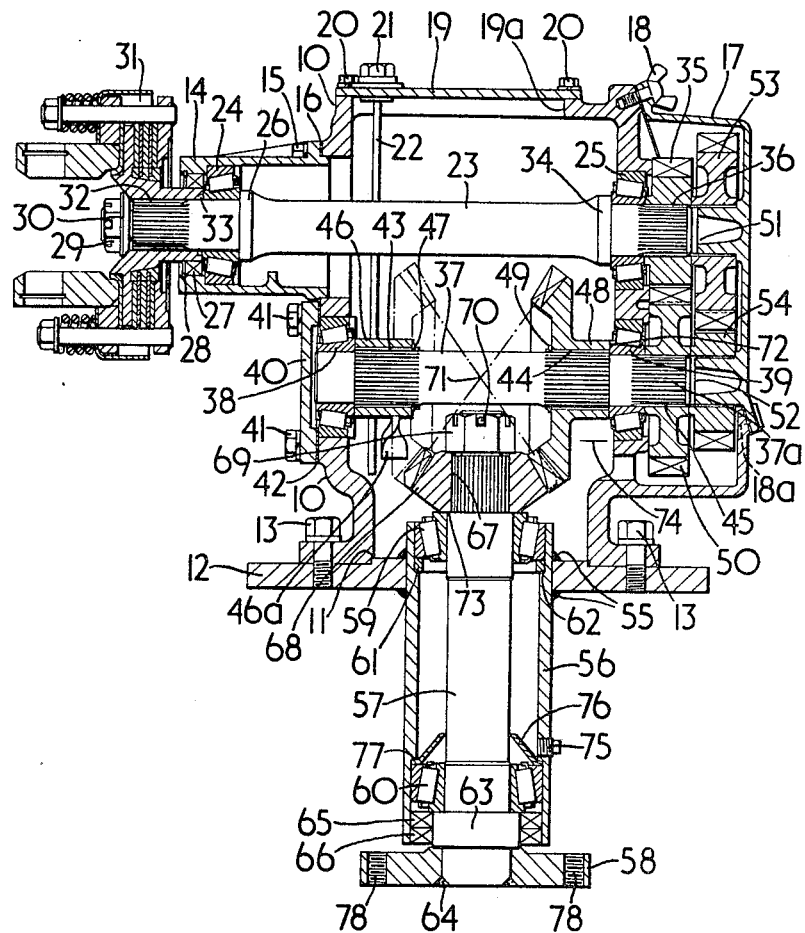
FIGURE 1 is a longitudinal vertical section through one form of drive transmission gearbox, according to the present invention, with a vertical output shaft.
Figure 2:
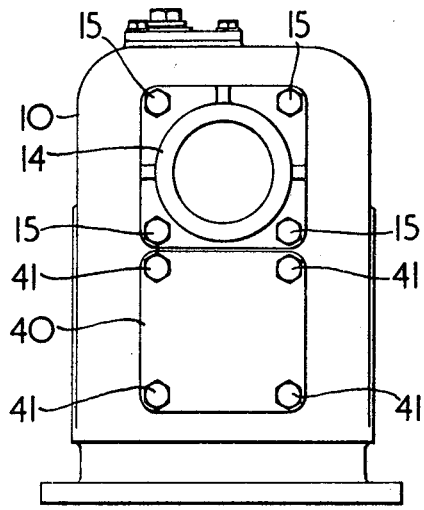
FIGURE 2 is an elevation of the left-hand end of the gearbox casing shown in FIGURE 1.

Referring to FIGURE 1 the main portions 10 of the gearbox casing has a spigotal connection 11 to a base plate 12 to which it is secured by a circle of bolts 13. At the front of casing 10 is a spigotally-fitting forward extension 14 held in position by bolts 15 which extend through an intermediate sealing gasket 16, while at the rear it has a removable cover 17 held in position by wing-headed screws 18, only the screw-threaded hole 18a for the lower wing-headed screw being shown in the lower position in the figure. The top of the casing provided with a removable cover plate 19, for an opening 19a, held in position by screws 20 and provided with a hexagon-headed plug 21 for closing a filler opening from which depends a dipstick 22 for measuring lubricating oil in the casing.

The input shaft for the gearbox is shown at 23, being supported in front and rear roller thrust bearings 24 and 25, respectively. The front bearing 24, which is within extension 14, is axially located between a flange 26 on the shaft and an oil seal 27 held in position by a circlip 28, the flange being urged towards the bearing by the action of a nut 29 acting on a conical thrust washer 30 which also holds a coupling 31, splined to the shaft at 32, against the inner race of bearing 24 with a sealing ring 33 between them. The coupling shown is of a known overload-slipping type, and through it is transmitted a drive from the power take-off shaft (not shown) of an associated tractor.

Adjacent its rear end shaft 23 has another flange 34 locating against the inner race of bearing 25, and it has a spur gear wheel 35 splined to it at 36.

The driving shaft is shown at 37 and is supported, parallel to the input shaft, by front and rear roller thrust bearings 38 and 39 of which the former is an opening closed by a cover plate 40 held to casing 10 by screws 41, with an intervening sealing gasket 42. Shaft 37 has three axially-spaced, splined portions 43, 44 and 45, the last-mentioned one being on a reduced diameter rear end portion 37a of the shaft. As shown, an internally-splined sleeve 46, provided with a lubricating oil paddle 46a is mounted on splined portion 43 of the shaft and is held abutting the inner race of bearing 38 by a circlip 47 to locate the shaft against forward movement, while an internally-splined bevel gear wheel 48 is mounted on splined portion 44 of the shaft and is held abutting the inner race of bearing 39 by a circlip 49 to locate the shaft against rearward movement. Splined shaft portion 45 carries a spur gear wheel 50 meshed by spur gear wheel 35 to drive shaft 37.

The removable cover 17 at the rear of casing 10 is provided on its inside with bosses 51 and 52 on which are supported a spare pair of spur gear wheels 53 and 54. The pair of gear wheels 35 and 50, which are shown in the operative position are of different sizes and can have their positions on shafts 23 and 37 exchanged so as to provide two different ratios for the driving of shaft 37, and the pair of gear wheels 53 and 54 are also of different sizes and can be exchanged for gear wheels 35 and 50 for enabling shaft 37 to be driven at two further different ratios from shaft 23, gear wheels 35 and 50 then being stowed on bosses 51 and 52. It will be observed that the gear wheels which are stowed on the said bosses prevent the gear wheels on shafts 23 and 37 from sliding off the ends of the respective splined portions 36 and 45.

Welded at 55 within an opening in base plate 12 is a downwardly-directed cylindrical casing 56 for an output shaft 57 having a driving flange 58 at its lower, extending end. Shaft 57 is journalled adjacent its upper and lower ends by respective roller thrust bearings 59 and 60, the outer race of bearing 59 resting an a thrust ring 61 supported on a step 62 within casing 56, with the inner race of bearing 60 abutting a flange 63 on the shaft, the underside of which flange is abutted by driving flange 58 which is welded to the shaft at 64. Two rings 65 and 66 seal the annulus between shaft flange 63 and casing 56.

At its upper end shaft 57 has a splined portion 67 on which is fitted an internally splined bore of a bevel gear wheel 68 which is meshed by bevel gear wheel 48 and is held in position by a castellated nut 69 and coacting pin 70.

As shown bevel gear wheels 48 and 68 are of different diameters but it is arranged for the axial distance between their common cone point 71 and their respective bases 72 and 73 to be the same so that their positions can be interchanged for altering the ratio of the drive from shaft 37 to shaft 57.

An important feature of the invention is that by removing cover plate 40, access is provided for shaft 37, together with bearing 38 and sleeve 46 to be slid out of casing 10, and the positions of sleeve 46 and bevel gear wheel 48 to be exchanged for driving shaft 57 in the reverse direction when the shaft is put back. The alternative position of bevel gear wheel 48 is shown in chain lines.

It is arranged that the lubricating oil in casing 10 shall be at the level indicated at 74, which is below the bottom of the opening closed by the removable cover 17, and for the oil to be drained, when necessary, by the removal of an outlet plug 75 in casing 56. An annular deflector 76, trapped between a shoulder 77 in casing 56, and the outer race of bearing 60, guides the outflowing oil when plug 75 is removed.

It will be seen that shaft 57 can be driven at a variety of ratios with reference to input shaft 37 by exchanging the relative positions of spur gear wheels 35 and 50, by substituting for them spur gear wheels 53 and 54 whose positions can be interchanged, and by exchanging the positions of bevel gear wheels 48 and 68, and, moreover, the direction of rotation of shaft 57 can be reversed by exchanging the positions of bevel gear wheel 48 and sleeve 46.

Driving flange 58 is shown provided with two screw-threaded holes 78 to receive screw-threaded pins, for example for supporting a cutting blade of a rotary grass mower.

Figure 3:
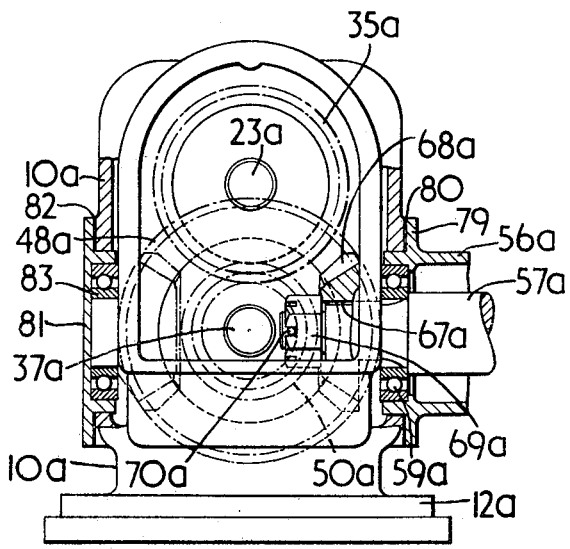
FIGURE 3 is a transverse vertical section through another form of the gearbox with a laterally-extending output shaft.

Referring now to FIGURE 3, in which like parts are given the same reference characters suffixed "a," the output shaft 57a and its casing 56a extend to one side of the casing 10a, and in this case casing 56a fits spigotally into an opening in casing 10a with a flange 79 abutting the latter with an intervening sealing gasket 80, the flange 79 being held to casing 10a by bolts (not shown). As shaft 57a in this case the roller thrust bearing is shown as having been replaced by a ball bearing 59a. Casing 56a and its flange 79 are of the same size as a closure plate 81 which spigots into the opposite side of casing 10a and is also held thereto by bolts (not shown) with an intervening sealing gasket 82. Interiorly closure plate 81 is provided with a ball bearing 83.

It will be seen that by exchanging the positions of casing 56a and closure plate 81, the drive can be changed to the opposite side of casing 10a with bevel gear wheel 68a in the position shown in chain lines.

What I claim as my invention and desire to secure by Letters Patent of the United States is:

1. A drive transmission gearbox comprising a driving shaft and an output shaft, said driving shaft at right-angles to said output shaft and extending across one end of said output shaft, respective bevel gear wheels on said driving and output shafts, a driving connection between each said bevel gear wheel and its respective shaft which permits removal of said bevel gear wheels from said shafts, said bevel gear wheel on said driving shaft in a position axially of the latter to mesh said bevel gear wheel on said output shaft in one diametral position wherein the improvement comprises, the bevel gear wheel on the driving shaft is of a different diameter than the bevel gear wheel on the output shaft, and both said bevel gear wheels have the same axial dimension between their back faces and their cone notional points whereby they can be interchanged so as to reverse the ratio of the drive to the output shaft.

2. A drive transmission gearbox according to claim 1 in which the driving connections between the driving and output shafts, on the one hand, and their respective bevel gear wheels on the other hand is by providing the shafts with spline teeth and the bevel gear wheels with axial bores of complementary cross-section.

3. A drive transmission gearbox according to claim 1 additionally comprising an input shaft parallel to the driving shaft, and a meshed gear wheel pair for driving said driving shaft from said input shaft.

4. A drive transmission gearbox according to claim 3 in which the gear wheels of the gear wheel pair have respective driving connections with the driving and input shafts which permit the said gear wheels to be removed therefrom for substitution by another gear pair providing a different drive ratio.

5. A drive transmission gearbox according to claim 4 in which said gear wheels of said gear pair are held axially fast with said driving shaft and input shaft by said other gear pair, said other gear pair stowed on bosses coaxial with said driving shaft and input shaft, said bosses attached to a cover removably secured to said gearbox.

6. A drive transmission gearbox according to claim 1 in which said driving shaft is provided with an alternative driving connection to its said bevel gear wheel to hold it in a position to mesh said bevel gear wheel on said output shaft in an alternative diametral position which is opposite to said one diametral position whereby said output shaft can be driven optionally in either direction.

7. A drive transmission gearbox according to claim 1 in which said driving shaft is provided with a lubricating oil paddle, said oil paddle being arranged within the casing of said gearbox.

References Cited

UNITED STATES PATENTS

| 2,755,686 | 7/1956 | Bade | 74—325 X |
| 3,015,966 | 1/1962 | Howard | 74—325 |
| 3,074,285 | 1/1963 | Hausmann | 74—325 X |
| 3,148,556 | 9/1964 | Gibbs et al. | 74—325 |
| 3,412,624 | 11/1968 | Wells | 74—325 |

LEONARD H. GERIN, Primary Examiner

U.S. Cl. X.R.

74—417